UNITED STATES PATENT OFFICE.

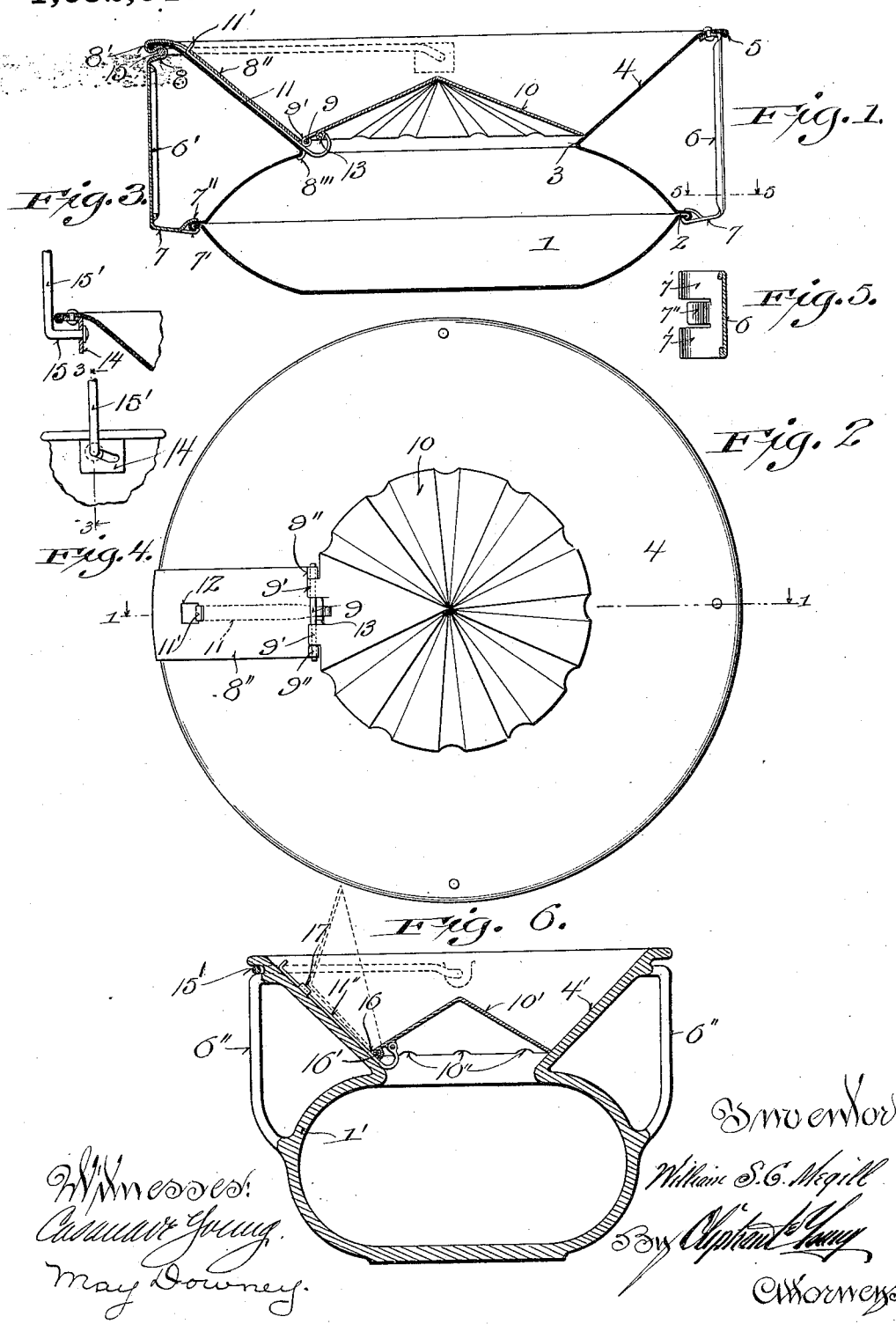

WILLIAM S. C. MEGILL, OF NATIONAL HOME, WISCONSIN.

CUSPIDOR OR ANALOGOUS VESSEL.

1,052,840. Specification of Letters Patent. Patented Feb. 11, 1913.

Application filed April 19, 1912. Serial No. 691,776.

*To all whom it may concern:*

Be it known that I, WILLIAM S. C. MEGILL, a citizen of the United States, and resident of National Home, in the county of Milwaukee and State of Wisconsin, have invented certain new and useful Improvements in Cuspidors or Analogous Vessels; and I do hereby declare that the following is a full, clear, and exact description thereof.

My invention refers to cuspidors, slopjars or analogous vessels, its object being to provide a simple, economical, efficient and sanitary device of this type.

Specific objects of my invention are to provide a bail attachment whereby the vessel may be conveniently suspended and carried from place to place, the bail when not in use being locked in a concealed horizontal position under the rim of the vessel; to provide a vessel of this general type having one or more integral side handles, whereby the vessel may be moved from place to place without danger of contact from the vessel's contents or other obnoxious matter thereon; to provide a hinged trap lid for the vessel whereby noxious gases arising from the interior of the vessel will be trapped, the trap at the same time permitting a flow of liquid to the body of the vessel through suitably arranged edge channels formed in said trap lid; to provide convenient means for opening and closing the trap, and to provide a detachable handle having an integral strap member to which the hinged trap lid is hinged, said hinged trap lid being also provided with an actuating slide lever in connection therewith whereby said hinged trap lid is swung open or closed.

With the above and other minor objects in view the invention consists in certain peculiarities of construction and combination of parts as set forth hereinafter with reference to the accompanying drawings and subsequently claimed.

In the drawings Figure 1 represents a longitudinal sectional view of a cuspidor embodying the features of my invention, the section being indicated by line 1—1 of Fig. 2; Fig. 2, a plan view of the same; Fig. 3, a detailed cross-section of a bail connection, the section being indicated by line 3—3 of Fig. 4; Fig. 4, a face view of the bail connection; Fig. 5, a detailed cross-section of a vessel side handle, the section being indicated by line 5—5 of Fig. 1, and Fig. 6, a longitudinal central sectional view of a cast cuspidor having side handles integrally cast therewith, the mouth of the cuspidor being provided with a hinged trap lid embodying the essential elements of my invention.

Referring by characters to the drawings with especial reference to Figs. 1 and 2, 1 represents the body of a standard type cuspidor having a belly seam 2, and a contracted mouth 3 from which extends a flared rim 4 provided with a beaded terminal 5. As shown the cuspidor is provided with a side handle 6 having an inturned foot 7, which foot is split to form a pair of upturned tongues 7' and an intermediate offset upwardly projecting tongue 7'', the several tongues being adapted to engage and tightly grip the beaded belly-seam 2 of the vessel whereby the lower end of the handle is secured, the upper end of said handle being riveted or otherwise permanently secured to the flared rim 4. A similar handle 6' is affixed to the belly-seam 2 upon the opposite side of the vessel having a foot 7 and set of tongues 7', 7'' corresponding to the handle 6 just described. The upper end of the side handle 6' however, is bent to form an inwardly extending loop 8 and an outwardly extending loop 8', which outwardly extending loop engages the rim 5 of the vessel's flared rim 4 and from this point the loop merges into a strap 8'' that extends downwardly and is snugly fitted to the face of the flared rim 4. The lower end of the strap 8'' is provided with downturned hook lips 8''' which overlap the intersecting point between the contracted mouth of the vessel and flared rim whereby the said side handle and strap are detachably secured to the vessel. The hooked end of the strap is also split and bent up to form eyes 9'' for a pintle 9 about which is also coiled leaf members 9' that extend from a conical hinged trap lid 10, the said trap being adapted to close the mouth of the vessel as shown and is provided with radial depressions constituting drains for fluids that are deposited in the mouth of the vessel, the lower edges of the corrugations being slightly cut away whereby said fluids will drain through the mouth and into the body of said vessel. The apex of the conical hinged trap lid as shown is considerably below the upper beaded edge of the flared rim and hence the trapped noxious gases within the body are prevented from entering the air currents that are circulated above the cuspidor, which cross currents tend to confine said noxious gases and prevent them from mixing and polluting the air. Thus it will be observed that the hinged trap lid is not only a sanitary precaution but that the same will cover the mouth of the vessel so that the unsightly fluids contained therein are not exposed. In order to provide means for raising and lowering the hinged trap lid without having contact with any part of the vessel which may be more or less soiled, I arrange a slidable bar 11, which bar is fitted under the strap 8" and arranged to rest against the upper face of the vessel's flared rim 4. The upper end of this bar is bent at approximately a right angle to form a finger grip 11', which grip projects through a slotted aperture 12 of the strap 8" whereby access may be had to said hand grip. The lower end of the slidable bar is curved upwardly as shown and is pivoted to a downwardly curled edge of the hinged trap lid, which curled edge receives a pivot-pin 13 whereby a connection between the bar and lid is effected. By this arrangement it is apparent that when the hand-grip is pulled upwardly, leverage will be exerted upon the hinged trap lid whereby the latter will be swung about its hinge to an open position and when the slide bar is depressed said lid will be swung to the closed position as shown in Fig. 1, attention being called to the fact that the finger grip 11' projects upwardly adjacent to the outer edge of the flared rim whereby it is not liable to be soiled in the use of the cuspidor.

While I have shown and described the conical hinged trap lid as being provided with radial serrations or corrugations it is apparent that I may, without departing from the spirit of my invention, provide such traps with smooth surfaces as shown in Fig. 6. It is apparent also that while I have shown and described the handle 6' and its integral strap as being detachably secured to the cuspidor in some instances the same may be riveted thereto but in other instances it may be desirable to form them detachable whereby the entire trap and side handle mechanism can be removed for effective sterilization.

As best shown in Figs. 3 and 4 the flared rim 4 of the vessel is provided with slotted ears 14 for the reception of inturned ends 15 of a bail 15', which bail, as shown in Fig. 1, when not in use is snapped under the beaded edge 5 of the flared rim and locked in this position by engagement with the inturned loop 8 of the side handle 6'. When it is desired to use the bail it can readily be withdrawn and swung to a vertical position, the spring in the metal permitting the inturned ends to draw outward in order to escape the beaded edges and to compensate for the difference in distance between the diametrically opposite beaded edges.

Referring to Fig. 6, I have shown a cast vessel of the cuspidor type having integral cast side handles 6", which handles connect the body of the vessel 1' with the flared rim 4'. The rim in this instance is provided with integral ears 16 for the reception of a pintle 16' that serves as a hinge connection for a smooth faced conical hinged trap lid 10', the same being provided with notches 10" in its edges through which the fluid that is discharged upon the flared rim and lid may pass to the interior of the vessel. A slidable bar 11" in this instance is fitted to the face of the flared rim 4 and retained by a lug or lugs 17 which may be cast integral with the flared rim, the lower end of the slidable bar being secured to the lid practically in the same manner as that previously mentioned in connection with the lid illustrated in Fig. 1. The bail 15' in this instance is similar to the bail previously mentioned and is adapted to snap under the flared rim, being seated between said rim and a shoulder of either integrally formed side handles.

I claim:

1. In a cuspidor or analogous vessel having a contracted mouth and a rim extending from its mouth; a hinged conical shaped trap lid for the mouth and operated by the sliding bar 11, the same being seated below the upper edge of the rim, and means projecting above the face of the flared rim in connection with the hinged conical shaped trap lid whereby the latter is raised or lowered.

2. In a cuspidor or analogous vessel having a flared rim extending from its mouth; a hinge member carried by the rim adjacent to the mouth, a conical hinged trap lid secured to the hinge member, and operated by a slidable bar in connection with the hinged trap lid whereby the same is raised or lowered.

3. In a cuspidor or analogous vessel having a belly body portion, contracted mouth and flared rim extending therefrom; the combination of a side handle secured to the vessel, a slotted strap extending from the side handle adapted to lie against the flared rim, hooked terminals extending from the strap adjacent to its hooked end, a hinged trap lid, and a slidable actuating bar in shackle connection with the hinged trap lid, the upper end of the bar being provided with a finger grip that extends through the strap slot.

4. In a cuspidor or analogous vessel having a body portion provided with a belly seam, a contracted mouth, and a flared rim extending from the mouth provided with a beaded terminal edge; the combination of a handle having a lower inturned end provided with tongue members adapted to grip the belly bead of the vessel, the upper end of the handle being provided with an inwardly projecting loop, and an outwardly projecting loop that overlaps the beaded edge of the rim, said rim terminating in a downwardly extending strap that is in interlocking engagement at its end with the edge of the vessel mouth, a lid for the vessel mouth in hinge connection with the strap, a slidable actuating bar secured to the lid, means in connection with the strap for guiding the slidable bar, and a bail in pivotal connection with the vessel rim, the bail being adapted to engage the inturned loop of the handle whereby said bail is supported when not in use.

5. In a cuspidor or analogous vessel provided with a flared rim having a beaded terminal edge; the combination of slotted ears rigidly secured to the flared rim, and a flexible bail having lower inturned rigid ends engageable with the ear slots, the inturned ends of the bail being adapted to have inward and outward movement in said slots incidental to movement of the bail to open or closed position.

In testimony that I claim the foregoing I have hereunto set my hand at Milwaukee in the county of Milwaukee and State of Wisconsin in the presence of two witnesses.

WILLIAM S. C. MEGILL.

Witnesses:
GEO. W. YOUNG,
M. E. DOWNEY.

---

Copies of this patent may be obtained for five cents each, by addressing the "Commissioner of Patents, Washington, D. C."